US012659790B2

(12) United States Patent
Ji et al.

(10) Patent No.: US 12,659,790 B2
(45) Date of Patent: Jun. 16, 2026

(54) SYSTEMS AND METHODS OF TRANSMISSION OF DATA UNIT SETS BY QUALITY-OF-SERVICE LEVEL

(71) Applicant: Meta Platforms Technologies, LLC, Menlo Park, CA (US)

(72) Inventors: Zhu Ji, Cupertino, CA (US); Yee Sin Chan, San Francisco, CA (US); Xiaodi Zhang, San Ramon, CA (US); Qi Qu, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 230 days.

(21) Appl. No.: 18/228,564

(22) Filed: Jul. 31, 2023

(65) Prior Publication Data

US 2024/0049040 A1 Feb. 8, 2024

Related U.S. Application Data

(60) Provisional application No. 63/395,639, filed on Aug. 5, 2022.

(51) Int. Cl.
*G06F 15/173* (2006.01)
*H04W 28/02* (2009.01)

(52) U.S. Cl.
CPC .............................. *H04W 28/0268* (2013.01)

(58) Field of Classification Search
CPC .................................................. H04W 28/0268
USPC ........................................................ 709/238
See application file for complete search history.

(56) References Cited

U.S. PATENT DOCUMENTS

| | | | |
|---|---|---|---|
| 7,873,065 B1 | 1/2011 | Mukerji et al. | |
| 11,665,261 B1 | 5/2023 | Carofiglio et al. | |
| 11,800,410 B1 | 10/2023 | Li et al. | |
| 2007/0296854 A1* | 12/2007 | Berkey .......... | H04N 21/234381 |
| | | | 375/E7.181 |
| 2016/0234750 A1* | 8/2016 | Damji ................. | H04W 36/144 |
| 2016/0353316 A1 | 12/2016 | Boettger et al. | |
| 2017/0086090 A1 | 3/2017 | Sharma et al. | |
| 2018/0006764 A1* | 1/2018 | Howes ................. | H04L 65/612 |
| 2019/0037468 A1 | 1/2019 | Bongaarts et al. | |

(Continued)

OTHER PUBLICATIONS

European Search Report for European Patent Application No. 23189855.2, dated Nov. 27, 2023, 10 pages.

(Continued)

*Primary Examiner* — Imad Hussain
(74) *Attorney, Agent, or Firm* — Foley & Lardner LLP

(57) ABSTRACT

Aspects of this technical solution can include receiving, by a wireless communication device, one or more of a plurality of data units corresponding to a first set configured according to a heuristic indicating a quality-of-service (QoS) level corresponding to the first set, determining, by the wireless communication device, a first parameter from one or more of the received plurality of data units, determining, by the wireless communication device, a second parameter from one or more of the received plurality of data units, selecting, by the wireless communication device, a second set including at least a subset of the received plurality of data units satisfying the second parameter, and transmitting, by the wireless communication device and according to the QoS level corresponding to the first set, the second set according to the second parameter.

18 Claims, 11 Drawing Sheets

(56) References Cited

U.S. PATENT DOCUMENTS

| | | | | |
|---|---|---|---|---|
| 2019/0166057 A1* | 5/2019 | Gilson | .................... | H04L 47/29 |
| 2020/0120168 A1 | 4/2020 | Nainar et al. | | |
| 2020/0404538 A1 | 12/2020 | Zhu et al. | | |
| 2021/0243749 A1* | 8/2021 | Hoang | .................. | H04W 72/02 |
| 2022/0014963 A1 | 1/2022 | Yeh et al. | | |
| 2022/0060929 A1* | 2/2022 | Hassan | ............. | H04W 28/0284 |
| 2022/0393819 A1* | 12/2022 | Lee | ....................... | H04L 5/0094 |
| 2023/0292198 A1 | 9/2023 | Veijalainen et al. | | |
| 2024/0049061 A1* | 2/2024 | Chan | ................. | H04W 28/0268 |
| 2024/0073734 A1* | 2/2024 | Ji | ...................... | H04W 28/0268 |
| 2024/0098018 A1 | 3/2024 | Li et al. | | |
| 2024/0098647 A1 | 3/2024 | Hu et al. | | |
| 2024/0430193 A1 | 12/2024 | Balakrishnan et al. | | |
| 2025/0150895 A1* | 5/2025 | Wong | ............... | H04W 28/0236 |

OTHER PUBLICATIONS

Qualcomm Incorporated: "KI#4 and KI#5: Solution for PDU Set Control QoS Framework," 3GPP Draft; S2-2203547, Apr. 11, 2022, 7 pages, retrieved from the Internet URL: https://ftp.3gpp.org/tsg_sa/WG2_Arch/TSGS2_150E_Electronic_2022-04/INBOX/S2-2203547.zip.

Vivo: "Solution for KI#45 Handling PDU Set within QoS Flow," 3GPP Draft; S2-2202111, Mar. 29, 2022, 5 pages, retrieved from the Internet URL: https://ftp.3gpp.org/tsg_sa/WG2_Arch/TSGS2_150E_Electronic_2022-04/Docs/S2-2202111.zip.

* cited by examiner

200

150

Front Rigid Body
205

Left
Side
240E

Front
Size
240A

Sensors
155

Band
210

Top Side
240B

Wireless
Interface
165

Processor
170

Bottom
Side
240C

Right
Side
240D

300

500B

504B

522B

522B

520B

502

510

512

510

700

| PDU Quantity Parameter | 710 |
| PDU Threshold Parameter | 720 |
| Previous PDU Dependency Parameter | 730 |
| Next PDU Dependency Parameter | 740 |
| PDU Sequence Parameter | 750 |
| Payload | 760 |

SYSTEMS AND METHODS OF TRANSMISSION OF DATA UNIT SETS BY QUALITY-OF-SERVICE LEVEL

CROSS-REFERENCE TO RELATED PATENT APPLICATIONS

This application claims the benefit of priority under 35 U.S.C. § 119 to U.S. Provisional Patent Application Ser. No. 63/395,639, entitled "SYSTEMS AND METHODS OF QUALITY-OF-SERVICE FOR CROSS-LAYER PROTO-COL DATA UNIT SET," filed Aug. 5, 2022, the contents of all such applications being hereby incorporated by reference in its their entirety and for all purposes as if completely and fully set forth herein.

TECHNICAL FIELD

The present implementations relate generally to commu-nications, including but not limited to transmission of data unit sets by quality-of-service (QoS) level.

INTRODUCTION

Users increasingly demand greater access to information at greater volumes and with lower delay. Users also increas-ingly demand delivery of interactive content or instanta-neous communication through a wider array of computing platforms. However, various computing platforms can lack communication frameworks sufficient to provide interrup-tion-free transmission of many types of communication as demanded by user needs.

SUMMARY

This technical solution is directed to identifying groups of data packets associated with particular application layer outputs, and processing the groups of data packets across communication layers and sub-layers based on particular latency characteristics common to each group of data pack-ets and associated with particular layers and sub-layers. For example, a data packet can include a protocol data unit (PDU) and a group of data packets can include a PDU set. For example, an application layer output can include a single frame of a video or a single slice of a frame of a video transmitted as a plurality of data packets. Here, each data packet or PDU can be associated with a particular frame or slice, and a data packet group or PDU set can include all data packets associated with that particular frame or slice. A frame can include, for example, a video frame. A slice can include, for example, a portion of a frame based on one or more of pixel characteristics or pixel location within the frame. The slice can, for example, be larger than a macro-block of a video frame (e.g., H.264 macroblock) and smaller than the frame. This technical solution can provide technical improvements including at least a more efficient and/or effective method of processing data packets or PDUs (e.g., forwarding and/or discarding PDUs). In particular, process-ing can be done concurrently on multiple data packets (e.g., PDUs) in a particular group (e.g., a PDU set) based on group-level or group-specific characteristics, rather than individually based on packet/PDU specific characteristics. For example, group-level or group-specific characteristics can include a QoS level specified on a per-PDU set basis. For example, one or more PDU sets can be associated with one or more varying QoS levels each associated with particular individual PDU sets. Thus, a technical solution for transmission of data unit sets by QoS level is provided.

At least one aspect is directed to a method. The method can include receiving, by a wireless communication device, one or more of a plurality of data units corresponding to a first set configured according to a heuristic indicating a QoS level corresponding to the first set (e.g., a threshold, which can for instance include/represent a minimum percent or number of PDUs sufficient to reconstruct the first set of PDUs). The method can include determining, by the wire-less communication device, a first parameter (e.g., a PDU parameter such as N_pdu, L_dep, R_dep) from one or more of the received plurality of data units. The method can include determining, by the wireless communication device, a second parameter from one or more of the received plurality of data units. The method can include selecting, by the wireless communication device, a second set that can include at least a subset of the received plurality of data units satisfying the second parameter (e.g., valid PDUs). The method can include transmitting, by the wireless communi-cation device and according to the QoS level corresponding to the first set, the second set according to the second parameter.

At least one aspect is directed to an apparatus such as a wireless communication device. The apparatus can include one or more processors. The apparatus can receive one or more of a plurality of data units corresponding to a first set configured according to a heuristic indicating a QoS level corresponding to the first set. The apparatus can determine a first parameter from one or more of the received plurality of data units. The apparatus can determine a second param-eter from one or more of the received plurality of data units. The apparatus can select a second set that can include at least a subset of the received plurality of data units satisfying the second parameter. The apparatus can transmit, according to the QoS level corresponding to the first set, the second set according to the second parameter.

At least one aspect is directed to a non-transitory, com-puter-readable medium that can include one or more instruc-tions stored thereon and executable by a processor (e.g., at least one processor). The processor can receive one or more of a plurality of data units corresponding to a first set configured according to a heuristic indicating a QoS level corresponding to the first set. The processor can determine a first parameter from one or more of the received plurality of data units. The processor can determine a second param-eter from one or more of the received plurality of data units. The processor can select a second set that can include at least a subset of the received plurality of data units satisfying the second parameter. The processor can transmit, according to the QoS level corresponding to the first set, the second set according to the second parameter.

BRIEF DESCRIPTION OF THE FIGURES

These and other aspects and features of the present implementations are depicted by way of examples in the figures discussed herein. Present implementations can be directed to, but are not limited to, examples depicted in the figures discussed herein. Thus, this disclosure is not limited to any figure or portion thereof depicted or referenced herein, or any aspect described herein with respect to any figures depicted or referenced herein.

FIG. 7 depicts an example PDU architecture according to an example implementation of the present disclosure.

DETAILED DESCRIPTION

Aspects of this technical solution are described herein with reference to the figures, which are illustrative examples of this technical solution. The figures and examples below are not meant to limit the scope of this technical solution to the present implementations or to a single implementation, and other implementations in accordance with present implementations are possible, for example, by way of interchange of some or all of the described or illustrated elements. Where certain elements of the present implementations can be partially or fully implemented using known components, only those portions of such known components that are necessary for an understanding of the present implementations are described, and detailed descriptions of other portions of such known components are omitted to not obscure the present implementations. Terms in the specification and claims are to be ascribed no uncommon or special meaning unless explicitly set forth herein. Further, this technical solution and the present implementations encompass present and future known equivalents to the components referred to herein by way of description, illustration, or example.

This technical solution can provide an optimized delivery of various extended reality (XR) traffic based on XR traffic characteristic, QoS metrics, and attributes of one or more layers or sub-layers. For example, XR traffic can include video data packets or audio data packets corresponding to augmented reality presentations (AR), virtual reality presentations (VR), or the like.

Figure 1:
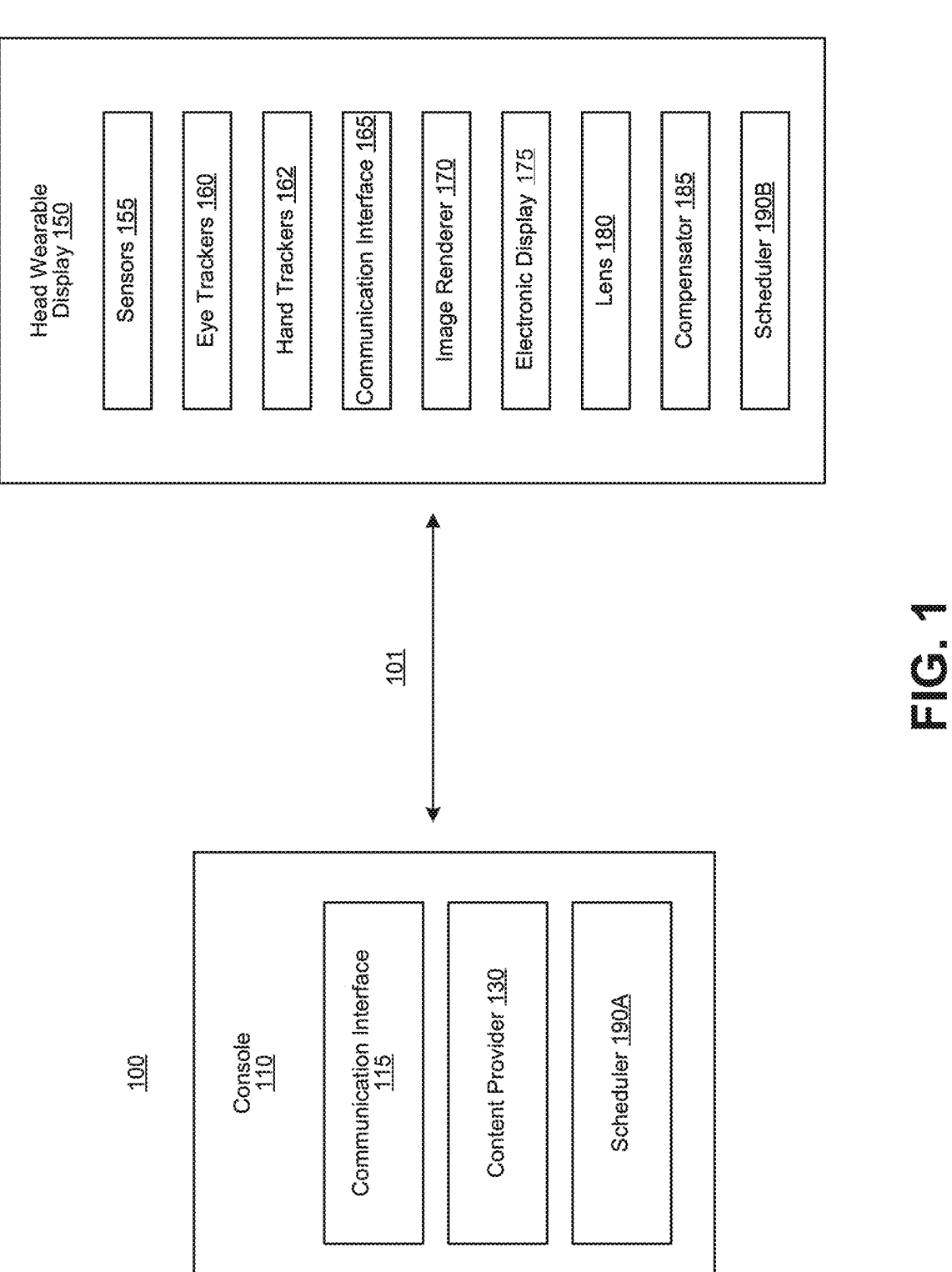
FIG. 1 is a diagram of a system environment including an artificial reality system, according to an example implemen-tation of the present disclosure.

FIG. 1 is a block diagram of an example artificial reality system environment 100 in which a console 110 operates. FIG. 1 provides an example environment in which devices may communicate traffic streams with different latency sensitivities/requirements. In some embodiments, the artificial reality system environment 100 includes an HWD 150 worn by a user, and a console 110 providing content of artificial reality to the HWD 150. A head wearable display (HWD) may be referred to as, include, or be part of a head-mounted display (HMD), head-mounted device (HMD), head-wearable device (HWD), head-worn display (HWD) or head-worn device (HWD). In one aspect, the HWD 150 may include various sensors to detect a location, an orientation, and/or a gaze direction of the user wearing the HWD 150, and provide the detected location, orientation and/or gaze direction to the console 110 through a wired or wireless connection. The HWD 150 may also identify objects (e.g., body, hand face).

The console 110 may determine a view within the space of the artificial reality corresponding to the detected location, orientation and/or the gaze direction, and generate an image depicting the determined view. The console 110 may also receive one or more user inputs and modify the image according to the user inputs. The console 110 may provide the image to the HWD 150 for rendering. The image of the space of the artificial reality corresponding to the user's view can be presented to the user. In some embodiments, the artificial reality system environment 100 includes more, fewer, or different components than shown in FIG. 1. In some embodiments, functionality of one or more components of the artificial reality system environment 100 can be distributed among the components in a different manner than is described here. For example, some of the functionality of the console 110 may be performed by the HWD 150, and/or some of the functionality of the HWD 150 may be performed by the console 110.

In some embodiments, the HWD 150 is an electronic component that can be worn by a user and can present or provide an artificial reality experience to the user. The HWD 150 may render one or more images, video, audio, or some combination thereof to provide the artificial reality experience to the user. In some embodiments, audio is presented via an external device (e.g., speakers and/or headphones) that receives audio information from the HWD 150, the console 110, or both, and presents audio based on the audio information. In some embodiments, the HWD 150 includes sensors 155, eye trackers 160, a communication interface 165, an image renderer 170, an electronic display 175, a lens 180, and a compensator 185. These components may operate together to detect a location of the HWD 150 and/or a gaze direction of the user wearing the HWD 150, and render an image of a view within the artificial reality corresponding to the detected location of the HWD 150 and/or the gaze direction of the user. In other embodiments, the HWD 150 includes more, fewer, or different components than shown in FIG. 1.

In some embodiments, the sensors 155 include electronic components or a combination of electronic components and software components that detect a location and/or an orientation of the HWD 150. Examples of sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and/or the rotational movement, and determine an orientation and location of the HWD 150. In one aspect, the sensors 155 can detect the translational movement and/or the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the eye trackers 160 include electronic components or a combination of electronic components and software components that determine a gaze direction of the user of the HWD 150. In some embodiments, the HWD 150, the console 110 or a combination may incorporate the gaze direction of the user of the HWD 150 to generate image data for artificial reality. In some embodiments, the eye trackers 160 include two eye trackers, where each eye tracker 160 captures an image of a corresponding eye and determines a gaze direction of the eye. In one example, the eye tracker 160 determines an angular rotation of the eye, a translation of the eye, a change in the torsion of the eye, and/or a change in shape of the eye, according to the captured image of the eye, and determines the relative gaze direction with respect to the HWD 150, according to the determined angular rotation, translation and the change in the torsion of the eye. In one approach, the eye tracker 160 may shine or project a predetermined reference or structured pattern on a portion of the eye, and capture an image of the eye to analyze the pattern projected on the portion of the eye to determine a relative gaze direction of the eye with respect to the HWD 150. In some embodiments, the eye trackers 160 incorporate the orientation of the HWD 150 and the relative gaze direction with respect to the HWD 150 to determine a gaze direction of the user. Assuming for an example that the HWD 150 is oriented at a direction 30 degrees from a reference direction, and the relative gaze direction of the HWD 150 is –10 degrees (or 350 degrees) with respect to the HWD 150, the eye trackers 160 may determine that the gaze direction of the user is 20 degrees from the reference direction. In some embodiments, a user of the HWD 150 can configure the HWD 150 (e.g., via user settings) to enable or disable the eye trackers 160. In some embodiments, a user of the HWD 150 is prompted to enable or disable the eye trackers 160.

In some embodiments, the hand tracker 162 includes an electronic component or a combination of an electronic component and a software component that tracks a hand of the user. In some embodiments, the hand tracker 162 includes or is coupled to an imaging sensor (e.g., camera) and an image processor that can detect a shape, a location and/or an orientation of the hand. The hand tracker 162 may generate hand tracking measurements indicating the detected shape, location and/or orientation of the hand.

In some embodiments, the communication interface 165 includes an electronic component or a combination of an electronic component and a software component that communicates with the console 110. The communication interface 165 may communicate with a communication interface 115 of the console 110 through a communication link. The communication link may be a wireless link, a wired link, or both. Examples of the wireless link can include a cellular communication link, a near field communication link, Wi-Fi, Bluetooth, or any communication wireless communication link. Examples of the wired link can include a USB, Ethernet, Firewire, HDMI, or any wired communication link. In embodiments in which the console 110 and the HWD 150 are implemented on a single system, the communication interface 165 may communicate with the console 110 through a bus connection or a conductive trace. Through the communication link, the communication interface 165 may transmit to the console 110 sensor measurements indicating the determined location of the HWD 150, orientation of the HWD 150, the determined gaze direction of the user, and/or hand tracking measurements. Moreover, through the communication link, the communication interface 165 may receive from the console 110 sensor measurements indicating or corresponding to an image to be rendered.

Using the communication interface, the console 110 (or HWD 150) may coordinate operations on link 101 to reduce collisions or interferences. For example, the console 110 may coordinate communication between the console 110 and the HWD 150. In some implementations, the console 110 may transmit a beacon frame periodically to announce/advertise a presence of a wireless link between the console 110 and the HWD 150 (or between two HWDs). In an implementation, the HWD 150 may monitor for or receive the beacon frame from the console 110, and can schedule communication with the HWD 150 (e.g., using the information in the beacon frame, such as an offset value) to avoid collision or interference with communication between the console 110 and/or HWD 150 and other devices.

The console 110 and HWD 150 may communicate using link 101 (e.g., intralink). Data (e.g., a traffic stream) may flow in a direction on link 101. For example, the console 110 may communicate using a downlink (DL) communication to the HWD 150 and the HWD 150 may communicate using an uplink (UL) communication to the console 110.

In some embodiments, the image renderer 170 includes an electronic component or a combination of an electronic component and a software component that generates one or more images for display, for example, according to a change in view of the space of the artificial reality. In some embodiments, the image renderer 170 is implemented as a processor (or a graphical processing unit (GPU)) that executes instructions to perform various functions described herein. The image renderer 170 may receive, through the communication interface 165, data describing an image to be rendered, and render the image through the electronic display 175. In some embodiments, the data from the console 110 may be encoded, and the image renderer 170 may decode the data to generate and render the image. In one aspect, the image renderer 170 receives the encoded image from the console 110, and decodes the encoded image, such that a communication bandwidth between the console 110 and the HWD 150 can be reduced.

In some embodiments, the image renderer 170 receives, from the console, 110 additional data including object information indicating virtual objects in the artificial reality space and depth information indicating depth (or distances from the HWD 150) of the virtual objects. Accordingly, the image renderer 170 may receive from the console 110 object information and/or depth information. The image renderer 170 may also receive updated sensor measurements from the sensors 155. The process of detecting, by the HWD 150, the location and the orientation of the HWD 150 and/or the gaze direction of the user wearing the HWD 150, and generating and transmitting, by the console 110, a high resolution image (e.g., 1920 by 1080 pixels, or 2048 by 1152 pixels) corresponding to the detected location and the gaze direction to the HWD 150 may be computationally exhaustive and may not be performed within a frame time (e.g., less than 11 ms or 8 ms).

In some implementations, the image renderer 170 may perform shading, reprojection, and/or blending to update the image of the artificial reality to correspond to the updated location and/or orientation of the HWD 150. Assuming that a user rotated their head after the initial sensor measurements, rather than recreating the entire image responsive to the updated sensor measurements, the image renderer 170 may generate a small portion (e.g., 10%) of an image corresponding to an updated view within the artificial reality according to the updated sensor measurements, and append the portion to the image in the image data from the console 110 through reprojection. The image renderer 170 may perform shading and/or blending on the appended edges. Hence, without recreating the image of the artificial reality according to the updated sensor measurements, the image renderer 170 can generate the image of the artificial reality.

In other implementations, the image renderer 170 generates one or more images through a shading process and a reprojection process when an image from the console 110 is not received within the frame time. For example, the shading process and the reprojection process may be performed adaptively, according to a change in view of the space of the artificial reality.

In some embodiments, the electronic display 175 is an electronic component that displays an image. The electronic display 175 may, for example, be a liquid crystal display or an organic light-emitting diode (OLED) display. The electronic display 175 may be a transparent display that allows the user to see through. In some embodiments, when the HWD 150 is worn by a user, the electronic display 175 is located proximate (e.g., less than 3 inches) to the user's eyes. In one aspect, the electronic display 175 emits or projects light towards the user's eyes according to image generated by the image renderer 170.

In some embodiments, the lens 180 is a mechanical component that alters received light from the electronic display 175. The lens 180 may magnify the light from the electronic display 175, and correct for optical error associated with the light. The lens 180 may be a Fresnel lens, a convex lens, a concave lens, a filter, or any suitable optical component that alters the light from the electronic display 175. Through the lens 180, light from the electronic display 175 can reach the pupils, such that the user can see the image displayed by the electronic display 175, despite the close proximity of the electronic display 175 to the eyes.

In some embodiments, the compensator 185 includes an electronic component or a combination of an electronic component and a software component that compensates for any distortions or aberrations. In one aspect, the lens 180 introduces optical aberrations such as a chromatic aberration, a pin-cushion distortion, barrel distortion, etc. The compensator 185 may determine a compensation (e.g., predistortion) to apply to the image to be rendered from the image renderer 170 to compensate for the distortions caused by the lens 180, and apply the determined compensation to the image from the image renderer 170. The compensator 185 may provide the predistorted image to the electronic display 175.

In some embodiments, the console 110 is an electronic component or a combination of an electronic component and a software component that provides content to be rendered to the HWD 150. In one aspect, the console 110 includes a communication interface 115 and a content provider 130. These components may operate together to determine a view (e.g., a field-of-view of the user) of the artificial reality corresponding to the location of the HWD 150 and/or the gaze direction of the user of the HWD 150, and can generate an image of the artificial reality corresponding to the determined view. In other embodiments, the console 110 includes more, fewer, or different components than shown in FIG. 1.

In some embodiments, the console 110 is integrated as part of the HWD 150. In some embodiments, the communication interface 115 is an electronic component or a combination of an electronic component and a software component that communicates with the HWD 150. The communication interface 115 may be a counterpart component to the communication interface 165 to communicate with a communication interface 115 of the console 110 through a communication link (e.g., USB cable, a wireless link). Through the communication link, the communication interface 115 may receive from the HWD 150 sensor measurements indicating the determined location and/or orientation of the HWD 150, the determined gaze direction of the user, and/or hand tracking measurements. Moreover, through the communication link, the communication interface 115 may transmit to the HWD 150 data describing an image to be rendered.

The content provider 130 can include or correspond to a component that generates content to be rendered according to the location and/or orientation of the HWD 150, the gaze direction of the user and/or hand tracking measurements. In one aspect, the content provider 130 determines a view of the artificial reality according to the location and orientation of the HWD 150 and/or the gaze direction of the user of the HWD 150. For example, the content provider 130 maps the location of the HWD 150 in a physical space to a location within an artificial reality space, and determines a view of the artificial reality space along a direction corresponding to an orientation of the HWD 150 and/or the gaze direction of the user from the mapped location in the artificial reality space.

The content provider 130 may generate image data describing an image of the determined view of the artificial reality space, and transmit the image data to the HWD 150 through the communication interface 115. The content provider 130 may also generate a hand model (or other virtual object) corresponding to a hand of the user according to the hand tracking measurement, and generate hand model data indicating a shape, a location, and an orientation of the hand model in the artificial reality space.

In some embodiments, the content provider 130 generates metadata including motion vector information, depth information, edge information, object information, etc., associated with the image, and transmits the metadata with the image data to the HWD 150 through the communication interface 115. The content provider 130 may encode the data describing the image, and can transmit the encoded data to the HWD 150. In some embodiments, the content provider 130 generates and provides the image to the HWD 150 periodically (e.g., every one second).

Figure 2:
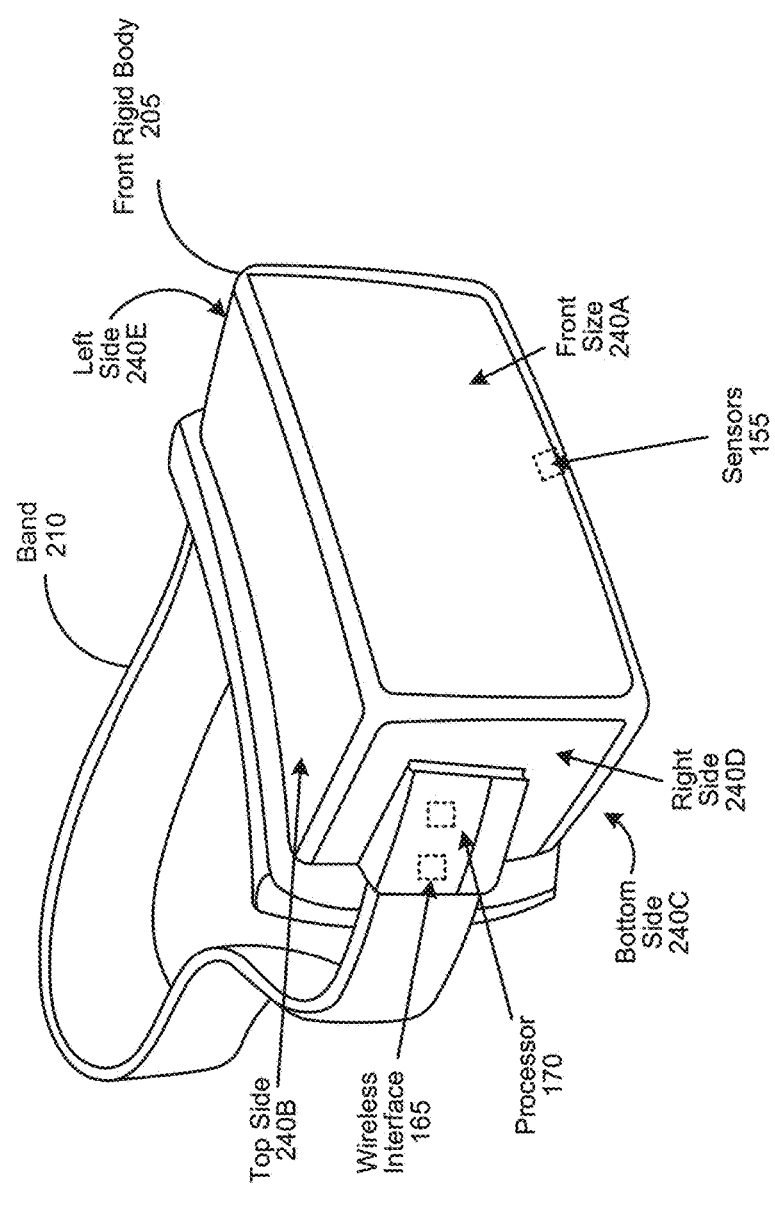
FIG. 2 is a diagram of a head wearable display according to an example implementation of the present disclosure.

FIG. 2 is a diagram 200 of an HWD 150, in accordance with an example embodiment. In some embodiments, the HWD 150 includes a front rigid body 205 and a band 210. The front rigid body 205 includes the electronic display 175 (not shown in FIG. 2), the lens 180 (not shown in FIG. 2), the sensors 155, the eye trackers 160, the communication interface 165, and the image renderer 170. In the embodiment shown by FIG. 2, the sensors 155 are located within the front rigid body 205, and may not be visible to the user. In other embodiments, the HWD 150 has a different configuration than shown in FIG. 2. For example, the image renderer 170, the eye trackers 160, and/or the sensors 155 may be in different locations than shown in FIG. 2.

Figure 3:
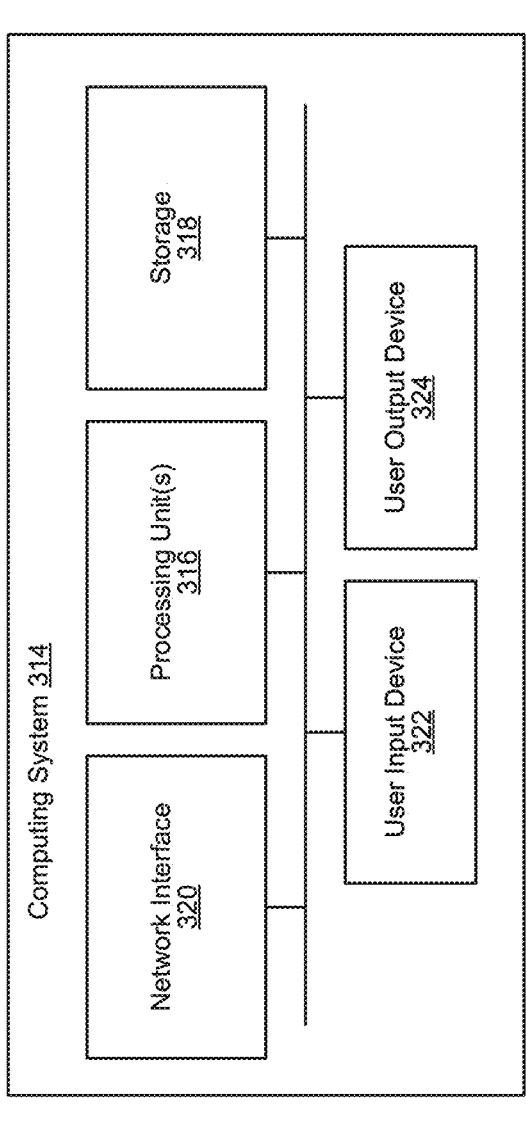
FIG. 3 is a block diagram of a computing environment according to an example implementation of the present disclosure.

Various operations described herein can be implemented on computer systems. FIG. 3 shows a block diagram 300 of a representative computing system 314 able to implement the present disclosure. In some embodiments, the console 110, the HWD 150 or both (FIG. 1) are implemented by the computing system 314. Computing system 314 can be implemented, for example, as a consumer device such as a smartphone, other mobile phone, tablet computer, wearable computing device (e.g., smart watch, eyeglasses, HWD), desktop computer, laptop computer, or implemented with distributed computing devices. The computing system 314 can be implemented to provide VR, AR, MR experience. In some embodiments, the computing system 314 can include conventional computer components such as processors 316, storage devices 318, network interfaces 320, user input devices 322, and user output devices 324.

Network interface 320 can provide a connection to a wide-area-network (WAN) (e.g., the Internet) to which a WAN interface of a remote server system is also connected. Network interface 320 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

The network interface 320 may include a transceiver to allow the computing system 314 to transmit and receive data from a remote device (e.g., an AP, a STA) using a transmitter and receiver. The transceiver may be configured to support transmission/reception supporting industry standards that enables bi-directional communication. An antenna may be attached to transceiver housing and electrically coupled to the transceiver. Additionally or alternatively, a multi-antenna array may be electrically coupled to the transceiver such that a plurality of beams pointing in distinct directions may facilitate in transmitting and/or receiving data.

A transmitter may be configured to wirelessly transmit frames, slots, or symbols generated by the processor unit 316. Similarly, a receiver may be configured to receive frames, slots, or symbols and the processor unit 316 may be configured to process the frames. For example, the processor unit 316 can be configured to determine a type of frame and to process the frame and/or fields of the frame accordingly.

User input device 322 can include any device (or devices) via which a user can provide signals to computing system 314. Computing system 314 can interpret the signals as indicative of particular user requests or information. User input device 322 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 324 can include any device via which computing system 314 can provide information to a user. For example, user output device 324 can include display-to-display images generated by or delivered to computing system 314. The display can incorporate various image generation technologies, e.g., liquid crystal display (LCD), light-emitting diode (LED) (including OLED) projection system, cathode ray tube (CRT), or the like, together with supporting electronics (e.g., digital-to-analog or analog-to-digital converters, signal processors, or the like). A device such as a touchscreen that function as both input and output device can be used. Output devices 324 can be provided in addition to or instead of a display. Examples include indicator lights, speakers, tactile "display" devices, printers, and so on.

Some implementations include electronic components, such as microprocessors, storage and memory that store computer program instructions in a computer-readable storage medium (e.g., non-transitory, computer-readable medium). Many of the features described in this specification can be implemented as processes that are specified as a set of program instructions encoded on a computer-readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 316 can provide various functionality for computing system 314, including any of the functionality described herein as being performed by a server or client, or other functionality associated with message management services.

It will be appreciated that computing system 314 is illustrative and that variations and modifications are possible. Computer systems used in connection with the present disclosure can have other capabilities not specifically described here. Further, while computing system 314 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is implemented. Implementations of the present disclosure can be realized in a variety of apparatus including electronic devices implemented using any combination of circuitry and software.

Data packet groups or PDU sets can be variously associated with different QoS levels (e.g., QoS requirements). For instance, each data packet group (or PDU set) can be assigned to a corresponding QoS level, so that all packets/PDUs in one data packet group (or PDU set) can support or are subject to that single QoS level. A QoS level can include a priority of transmission/processing of PDUs, and/or an acceptable packet error rate or an error rate threshold for conveying the PDUs. A QoS level (or QoS characteristics/parameters) can, for example, include a priority level, a packet delay budget, a packet error rate, a maximum data burst volume, and/or an averaging window.

This technical solution includes a PDU set that can contain content with a particular application layer output (e.g., video frame or audio frame) that is considered self-coherent. The technical solution can incorporate properties of various PDUs into the PDU set. The technical solution can control packet traffic based on a dependency of PDU sets, and can provide more efficient radio utilization and device power management by selectively performing transmission based on parameters including, for example, the TBS size parameter.

A PDU set can include slices based at least on one or more i-frames, p-frames, and/or b-frames. For example, an i-frame can be a reference frame, a p-frame can refer to an i-frame, and a b-frame can refer to both a p-frame and an i-frame. For example, an i-slice can be a reference slice, a p-slice can refer to an i-slice, and a b-slice can refer to both a p-slice and an i-slice. The technical solution can provide a technical improvement to prioritize delivery of video data packets over audio data packets in particular scenarios, and/or to prioritize delivery of audio data packets over video data packets in particular scenarios.

Figure 4:
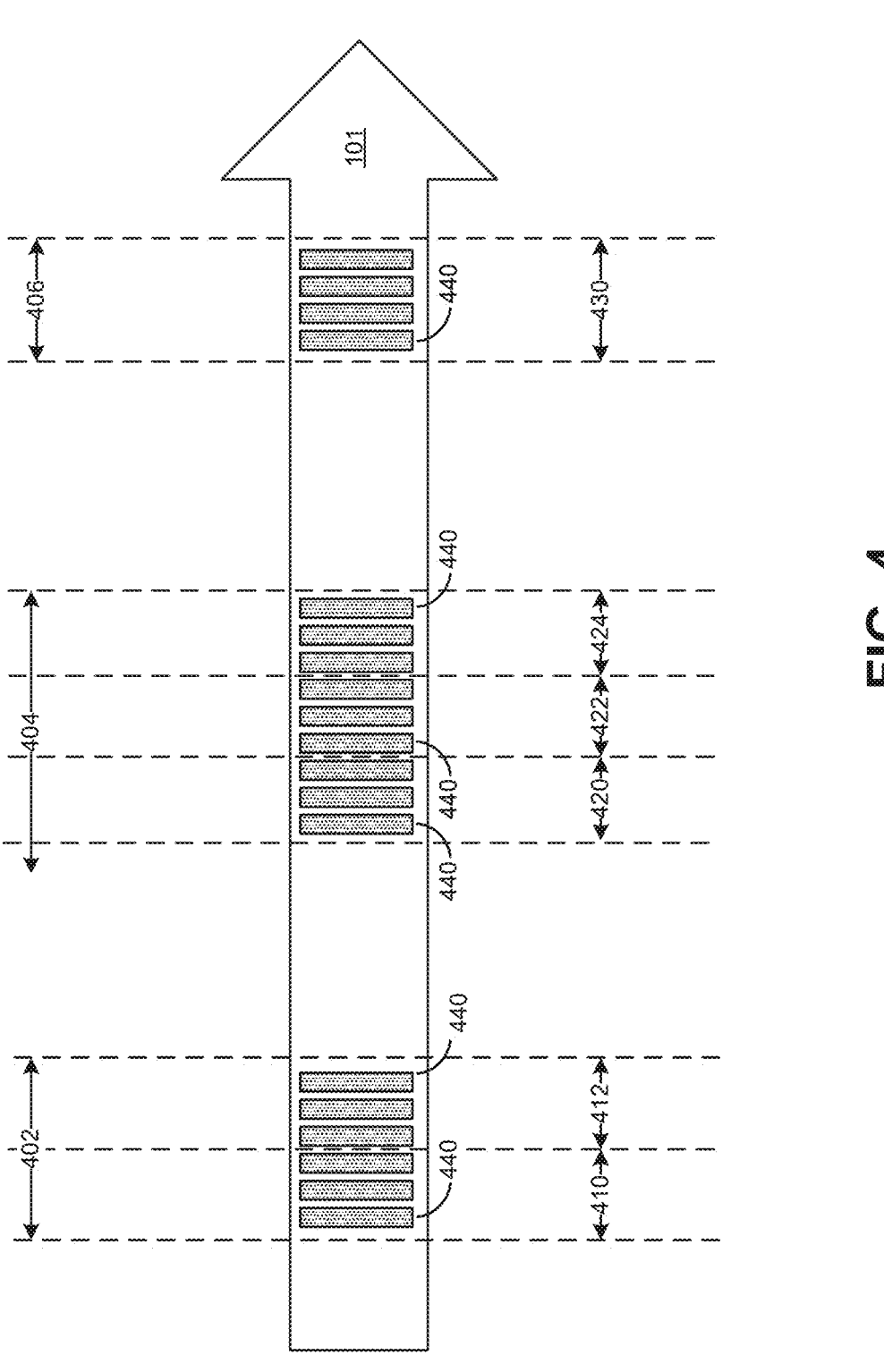
FIG. 4 depicts an example transmission architecture according to an example implementation of the present disclosure.

FIG. 4 depicts an example transmission architecture, in accordance with present implementations. As illustrated by way of example in FIG. 4, an example transmission architecture 400 can include at least a first burst 402, a second burst 404, a third burst 406, and PDUs 440.

The first burst 402 can correspond to a portion of a transmission according to the link 101. For example, the first burst 402 can include a first plurality of PDU sets corresponding to a first transmission according to a duty cycle or a transmission period. The first burst 402 can include a first PDU set 410, and a second PDU set 412.

The first PDU set 410 can include one or more PDUs each corresponding to any type of XR (or other) traffic. For example, the first PDU set 410 can correspond to a gaming session communication having first parameters associated therewith. For example, the first parameters can include priority, QoS requirements, or any combination thereof, minimizing latency for video of a gaming session.

The second PDU set 412 can include one or more PDUs each corresponding to any type of particular XR traffic. For example, the second PDU set 412 can correspond to a video call communication having second parameters associated therewith. For example, the second parameters can include priority, QoS requirements, or any combination thereof, minimizing latency for audio of a video call session. The second PDU set 412 can be transmitted subsequent to the first PDU set 410. Though discussed by way of example with respect to various types of XR traffic, the first PDU set 410 and the second PDU set 412 can be directed to any type of like traffic, any type of same traffic, or any type of different traffic.

The second burst 404 can include one or more PDUs each corresponding to particular XR traffic. The second burst 404 can be transmitted subsequent to the first burst 402 according to any duty cycle or delay, for example. The second burst 404 can correspond at least partially in one or more of structure and operation to the first burst 402. The second burst 404 can include a third PDU set 420, a fourth PDU set 422, and a fifth PDU set 424. The third PDU set 420 can correspond at least partially in one or more of structure and operation to at least one of the PDU sets 410 or 412. The third PDU set 420 can be transmitted subsequent to the second PDU set 412. The fourth PDU set 422 can correspond at least partially in one or more of structure and operation to at least one of the PDU sets 410, 412 or 420. The fourth PDU set 422 can be transmitted subsequent to the third PDU set 420. The fifth PDU set 424 can correspond at least partially in one or more of structure and operation to at least one of the PDU sets 410, 412, 420 or 422. The fifth PDU set 424 can be transmitted subsequent to the fourth PDU set 422. The third PDU set 420, the fourth PDU set 422 and the fifth PDU set 424 can be directed to any type of like traffic, any type of same traffic, or any type of different traffic, with respect to each other, with respect to at least one of the PDU sets 410 or 412, or any combination thereof.

The third burst 406 can include one or more PDUs each corresponding to particular XR traffic. The third burst 406 can be transmitted subsequent to the second burst 404 according to any duty cycle or delay, for example. The third burst 406 can correspond at least partially in one or more of structure and operation to at least one of the first burst 402 or the second burst 404. The third burst 406 can include a sixth PDU set 430.

The sixth PDU set 430 can correspond at least partially in one or more of structure and operation to at least one of the PDU sets 410, 412, 420, 422 or 424. The sixth PDU set 430 can be transmitted subsequent to the fifth PDU set 424. The sixth PDU set 430 can be directed to any type of like traffic, any type of same traffic, or any type of different traffic, with respect to each other, with respect to at least one of the PDU sets 410, 412, 420, 422 or 424, or any combination thereof.

The PDUs 440 can each include a corresponding payload indicating content of XR traffic, and can include one or more parameters identifying one or more of the PDU, a PDU set corresponding to the PDU, a dependency between the PDU and another PDU external to the PDU, a dependency between a PDU set including the PDU and another PDU set external to the PDU set including the PDU, or any combination thereof. The PDUs 440 can include any number and type of parameters and payloads, and can including combination of like, same or different parameters or payloads.

Figure 5A:
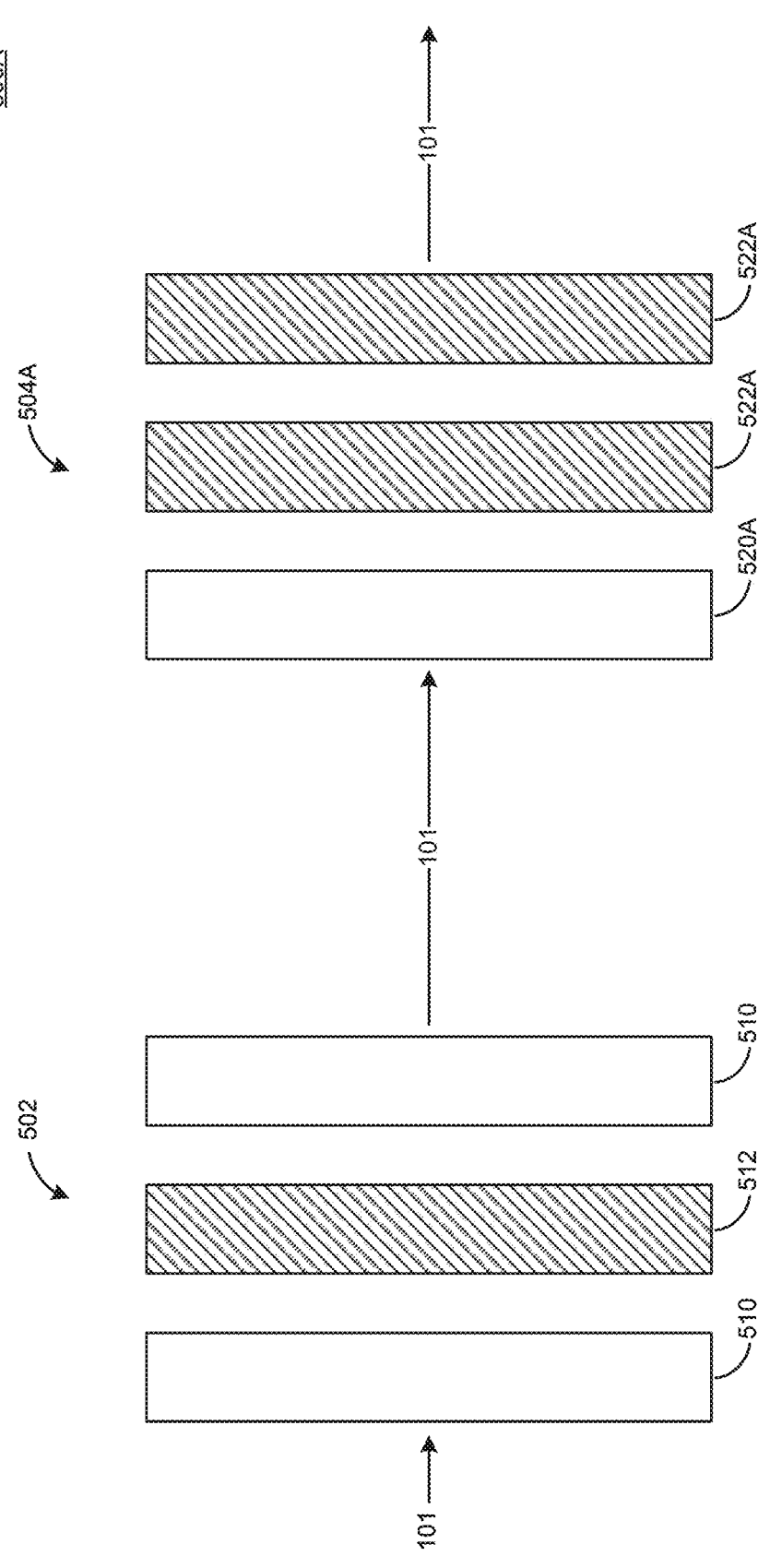
FIG. 5A depicts an example PDU set transmission according to present implementations.

FIG. 5A depicts an example PDU set transmission, in accordance with present implementations. As illustrated by way of example in FIG. 5A, an example PDU set transmission 500A can include at least a first PDU set 502, and/or a second PDU set 504A.

The first PDU set 502 can correspond to a transmission having a predetermined number of valid (e.g., successfully generated, received, decoded and/or recovered) PDUs and a transmission threshold. For example, the transmission threshold of the first PDU set 502 can correspond to a threshold that requires at least 50% of the PDUs of the first PDU set 502 to be valid in order to prevent discarding of the first PDU set 502. The first PDU set 502 can include one or more valid PDUs 510, and an invalid PDU 512. The valid PDUs 510 can correspond at least partially in one or more of structure and operation to various ones of the PDUs 440. For example, the environment 100 or the system 314 can determine that one or more of the PDUs 440 are valid PDUs 510, according to at least one of a determination that a time of receiving the PDU 440 satisfies a time threshold, or a determination that content of the PDU 440 satisfies an integrity threshold. For example, the time threshold can correspond to a timeout limit, and the integrity threshold can correspond to a limit on an amount or a percent of a payload that is corrupted in transit. The invalid PDU 512 can correspond at least partially in one or more of structure and operation to various ones of the PDUs 440. For example, the environment 100 or the system 314 can determine that one or more of the PDUs 440 are invalid PDU 512, according to at least one of a determination that a time of receiving the PDU 440 does not satisfy the time threshold, or a determination that content of the PDU 440 does not satisfy the integrity threshold.

The second PDU set 504A can correspond to a transmission having a predetermined number of valid PDUs and a transmission threshold, where one or more of the predetermined number of valid PDUs and the transmission threshold of the second PDU set 504A can be different from the corresponding number of valid PDUs and the transmission threshold of the first PDU set 502. For example, the transmission threshold of the second PDU set 504A can correspond to a threshold that requires at least 45% of the PDUs of the second PDU set 504A to be valid in order to prevent discarding of the second PDU set 504A. The second PDU set 504A can include a valid PDU 520A and one or more invalid PDUs 522A. The valid PDU 520A can correspond at least partially in one or more of structure and operation to various ones of the PDUs 440. For example, the environment 100 or the system 314 can determine that a PDU among the PDUs 440 is the valid PDU 520A, according to at least one of a determination that a time of receiving the PDU 440 satisfies the time threshold, or a determination that content of the PDU 440 satisfies the integrity threshold. The invalid PDUs 522A can correspond at least partially in one or more of structure and operation to various ones of the PDUs 440. For example, the environment 100 or the system 314 can determine that one or more of the PDUs 440 are invalid PDUs 522A, according to at least one of a determination that a time of receiving the PDU 440 does not satisfy the time threshold, or a determination that content of the PDU 440 does not satisfy the integrity threshold.

Figure 5B:
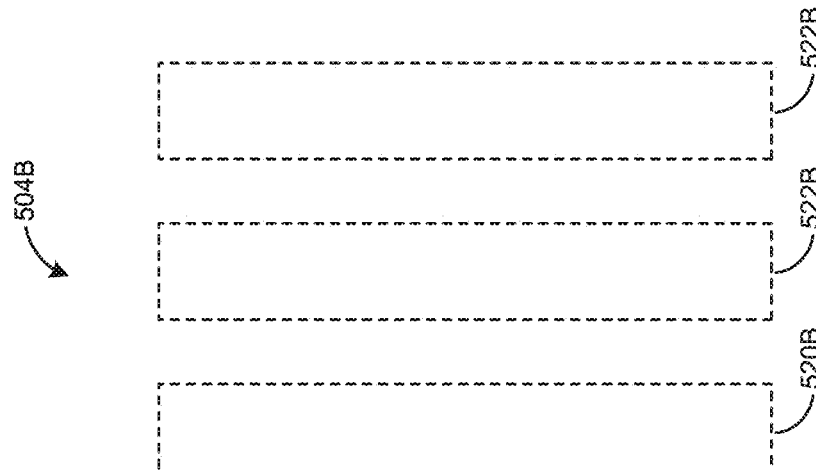
FIG. 5B depicts an example PDU set transmission according to an example implementation of the present disclosure.
Figure 5B:
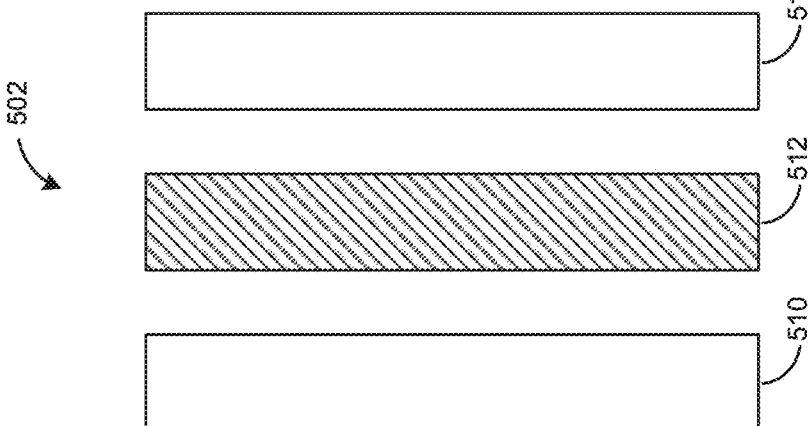

FIG. 5B depicts an example PDU set transmission, in accordance with present implementations. As illustrated by way of example in FIG. 5B, an example PDU set transmission 500B can include at least a discarded second PDU set 504B.

The discarded second PDU set 504B can be ignored or blocked from transmission/processing. For example, the environment 100 or the system 314 can discard the discarded second PDU set 504B by ignoring the discarded second PDU set 504B or blocking the discarded second PDU set 504B from further transmission/processing. For example, the discarded second PDU set 504B includes one valid PDU 520 and two invalid PDUs 522, resulting in a validity metric corresponding 33%. The environment 100 or the system 314 can determine that the validity metric of 33% does not satisfy the threshold of 45% corresponding to the second PDU set 504, and can subsequently discard the second PDU set 504 as the discarded second PDU set 504B. The discarded second PDU set 504B can include a discarded valid PDU 520B and one or more discarded invalid PDUs 522B. The discarded valid PDU 520B can be discarded according to the validity metric corresponding to the second PDU set 504, even though the discarded valid PDU 520B is valid. The discarded invalid PDUs 522B can be discarded according to the validity metric corresponding to the second PDU set 504. Thus, this technical solution can achieve at least a technical improvement of reducing computing resources spent processing PDUs that are part of PDU sets that cannot effectively construct or reconstruct a frame or block, for example.

Figure 6A:
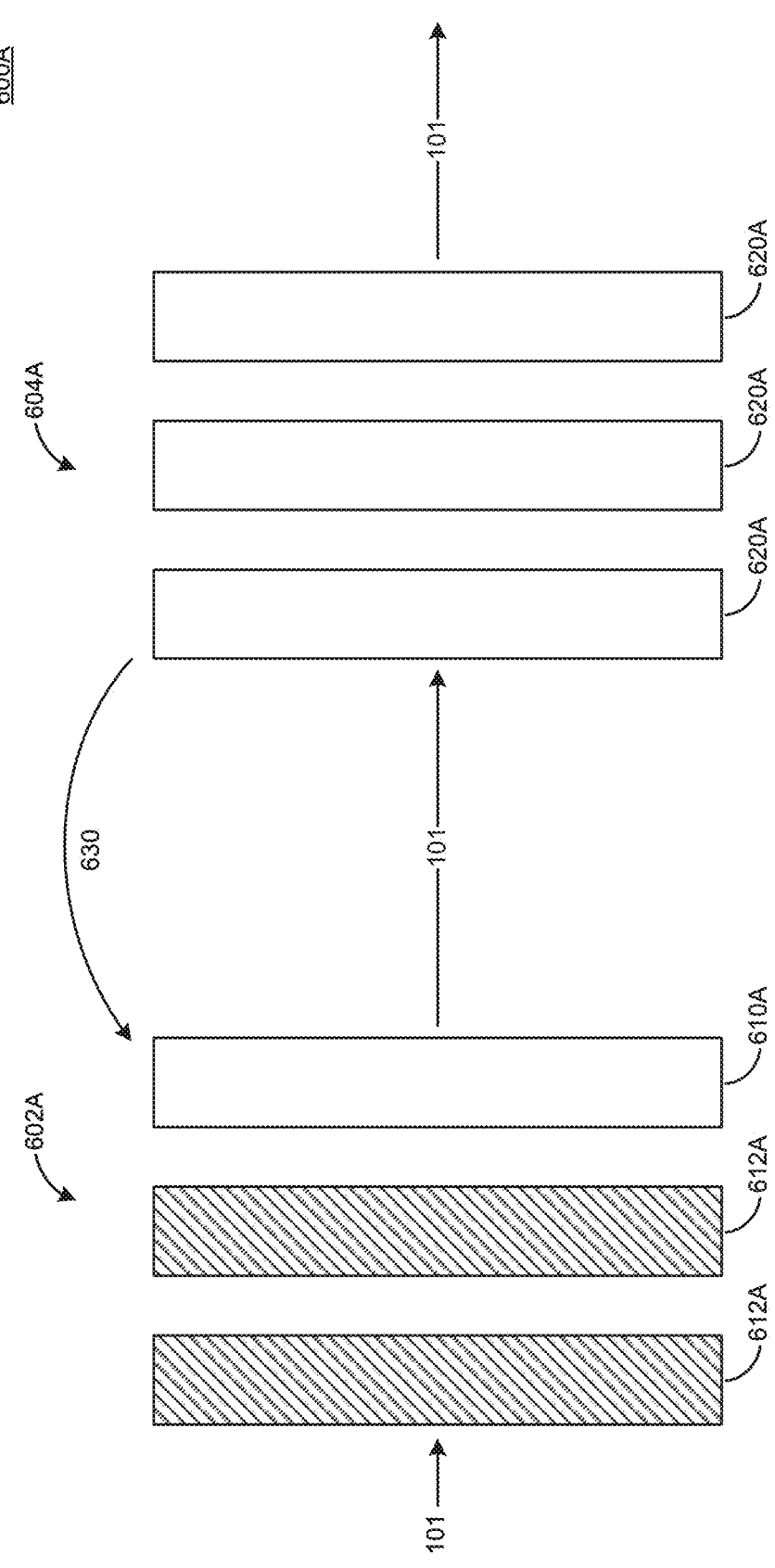
FIG. 6A depicts an example PDU set transmission according to an example implementation of the present disclosure.

FIG. 6A depicts an example PDU set transmission, in accordance with present implementations. As illustrated by way of example in FIG. 6A, an example PDU set transmission 600A can include at least a first PDU set 602A, a second PDU set 604A, and a previous PDU set dependency 630.

The first PDU set 602A can correspond to a transmission having a predetermined number of valid PDUs and a transmission threshold. For example, the transmission threshold of the first PDU set 602A can correspond to a threshold that requires at least 50% of the PDUs of the first PDU set 602A to be valid in order to prevent discarding of the first PDU set 602A. The first PDU set 602A can include a valid PDU 610A and one or more invalid PDUs 612A. The valid PDU 610A can correspond at least partially in one or more of structure and operation to the valid PDU 520A. The invalid PDUs 612A can correspond at least partially in one or more of structure and operation to the invalid PDUs 522A.

The second PDU set 604A can correspond to a transmission having a predetermined number of valid PDUs and a dependency threshold. The dependency threshold can correspond to a threshold that requires another PDU set to be valid, or not discarded, or any combination thereof, in order to determine that the second PDU set 604A is valid. The second PDU set 604A can include one or more valid PDUs 620A. The valid PDUs 620A can correspond at least partially in one or more of structure and operation to the valid PDU 520A.

The previous PDU set dependency 630 can correspond to a dependency of the second PDU set 604A on the first PDU set 602A. For example, the second PDU set 604A can include a parameter in one or more of the valid PDU 610A or the invalid PDUs 612A. For example, the previous PDU set dependency 630 can include or associate the dependency threshold with respect to a particular PDU set. As illustrated herein, the previous PDU set dependency 630 can indicate a dependency of the second PDU set 604A on the first PDU set. However, a PDU set dependency is not limited to the previous PDU set dependency 630, and can correspond to a dependency of any PDU set on any preceding or subsequent PDU set, including, for example, PDU sets separated by one or more intervening PDU sets in a sequence along the link 101.

PDU sets can be configured and/or processed to account for or reflect a dependency between one or more particular PDU sets, such as a dependency of a PDU set on one or more of an i-frame, a p-frame, and a b-frame equivalent of one or more other PDU sets. This dependency can, for example, include a dependency on/between particular frame(s) or particular slice(s) (e.g., each corresponding to or comprising a PDU set).

Figure 6B:
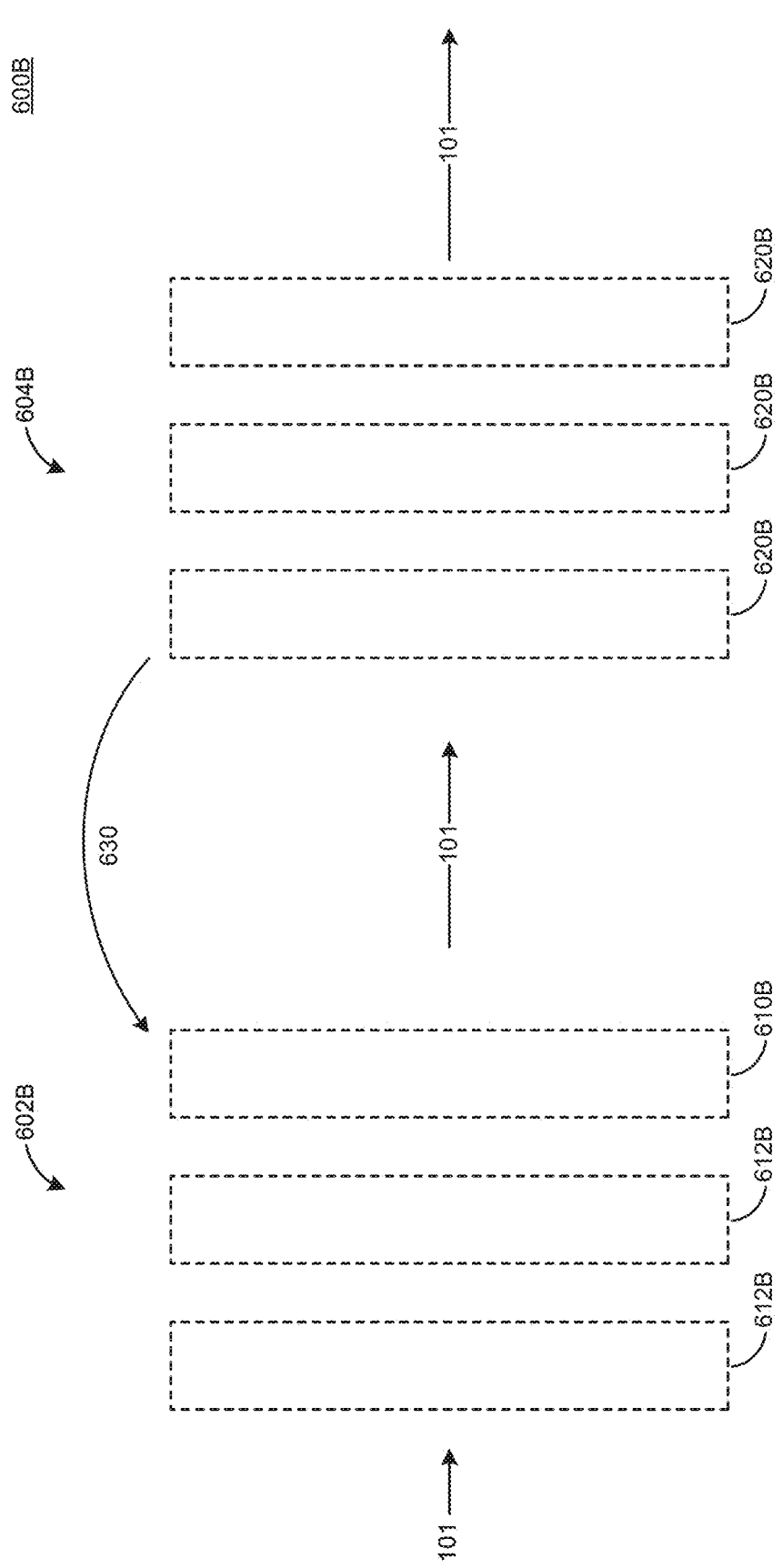
FIG. 6B depicts an example PDU set transmission according to an example implementation of the present disclosure.

FIG. 6B depicts an example PDU set transmission, in accordance with present implementations. As illustrated by way of example in FIG. 6B, an example PDU set transmission 600B can include at least a discarded first PDU set 602B, and a discarded second PDU set 604B. The discarded first PDU set 602B can correspond at least partially in one or more of structure and operation to the discarded second PDU set 504B. The discarded first PDU set 602B can include a discarded valid PDU 610B and one or more discarded invalid PDUs 612B.

The discarded second PDU set 604B can be ignored or blocked from transmission. For example, the environment 100 or the system 314 can discard the discarded second PDU set 604B by ignoring the discarded second PDU set 604B or blocking the discarded second PDU set 604B from further transmission. For example, the discarded second PDU set 604B can be discarded according to the previous PDU set dependency 630, where the previous PDU set dependency 630 can take precedence over a determination of validity of the second PDU set 604 according to the transmission threshold of the second PDU set 604. For example, the discarded second PDU set 604B includes three valid PDUs 620, resulting in a validity metric corresponding to 100%. The environment 100 or the system 314 can determine that the validity metric of 100% satisfies the threshold of 45% corresponding to the second PDU set 504, and can subsequently discard the second PDU set 504 since the discarded second PDU set 504B according to the dependency threshold that takes precedence over the transmission threshold.

The discarded second PDU set 604B can include one or more discarded valid PDUs 620B.

FIG. 7 depicts an example PDU architecture, in accordance with present implementations. As illustrated by way of example in FIG. 7, an example PDU architecture 700 can include at least a PDU quantity parameter 710, a PDU threshold parameter 720, a previous PDU dependency parameter 730, a next PDU dependency parameter 740, a PDU sequence parameter 750, and a PDU payload 760.

This technical solution can include various parameters to control transmission of particular data packets of a PDU set between various layers or sub-layers of a communication channel. For example, the communication channel can include a Layer 2 communication stack. The Layer 2 stack can include a service data adaptation protocol (SDAP) layer, a packet data convergence protocol (PDCP) layer, a radio link control (RLC) layer, and/or a medium access control (MAC) layer. The RLC layers can include a plurality of modes directed to packet data transfer control, including a transparent mode (TM), an unacknowledged mode (UM), and/or an acknowledged mode (AM). The RLC layer can control packet data traffic based on a MAC TBS size parameter.

The PDU quantity parameter 710 can correspond to or indicate a number of PDUs (e.g., "N_pdu"). The PDU threshold parameter 720 can correspond to or indicate a transmission threshold corresponding to a number of valid PDUs, a number of invalid PDUs, a percentage of valid PDUs, or a percentage of invalid PDUs (e.g., "C_pdu"). The previous PDU dependency parameter 730 can correspond to or indicate a dependency of a PDU according to the PDU architecture 700 on a PDU set preceding the PDU in transmission according to the link 101 (e.g., "L_dep"). The next PDU dependency parameter 740 can correspond to or indicate a dependency of a PDU according to the PDU architecture 700 on a PDU set subsequent to the PDU in transmission according to the link 101 (e.g., "R_dep"). The PDU sequence parameter 750 can correspond to or indicate a position of a PDU in a sequence of PDUs or a PDU set.

The RLC layer can perform packet discarding based at least on one or more of the parameters of the PDU set, e.g., to maintain/manage QoS. For example, the RLC layer can transmit a PDU set through or to the PDCP layer or the RLC layer, if N_pdu equal to or greater than C_pdu. Otherwise, the PDU set can be discarded, e.g., to maintain/manage QoS. Further, the RLC layer can perform packet discarding based on one or more dependencies between PDU sets. For example, if one or more PDU sets identified by L_dep or R_dep has been discarded, than the PDU set referencing the discarded PDU set can also be discarded. Discarding and dropping can be interchangeable terms. This technical solution can also discard PDU sets having a C_pdu greater than or below a predetermined number. Discarding PDU sets based on a predetermined number can provide a technical improvement including maintaining communication under physical conditions that may compromise operation of an STA. For example, discarding PDU sets based on C_pdu can reduce thermal load or power load in conditions where the device would exceed a thermal threshold or a power threshold otherwise. For example, the PDU sets can prevent or reduce the likelihood of STA device deactivation while maintaining application layer output and communication connectivity. For example, the PDU sets can eliminate one or more situations of STA device deactivation while performing lossy application layer output and communication connectivity.

The RLC layer can segment and combine communication at the MAC layer based on one or more parameters/properties of the PDU set, including the TBS size. For example, the TBS size can be based on PHY layer metrics, including MCS. For example, the TBS size can be greater if network congestion is lower, and smaller when network congestion is greater. For example, various PDU sets can be mapped to different TBS sizes. Thus, for example, the TBS size can be assigned to various PDU sets based on their content. For example, content can include video or audio. Thus, the technical solution can differentiate between different application layer outputs, including at least video and audio, to provide extended reality (XR) traffic by or to STA devices with greater QoS. Thus, this technical solution can provide technical improvements to XR traffic, including XR conversations that variously prioritize video or audio traffic. For example, XR conversations can include, but are not limited to holographic conversations/sessions.

The dependency between PDU sets and the TBS can affect whether and which portions of various PDU sets are included in a particular transfer block. For example, a first transfer block can be partially full as mapped to a first PDU set or portion thereof. A determination of whether the first transfer block is partially full can be based on a threshold of theta with respect to the TBS. For example, if a second PDU set is not dependent on the first PDU set, then the second PDU set is not mapped to the first transfer block, and can be mapped to a second transfer block. For example, if a second PDU set is dependent on the first PDU set, then the second PDU set is mapped to the first transfer block up to filling the first transfer block, and the remaining portion of the second PDU set can be mapped to a second transfer block.

The above discarding, sending/forwarding and/or mapping operations may be specified or configured in one or more rules (e.g., mapping rule, discard rule, forwarding rule), and can be implemented in any one or more of the layers/sublayers discussed above (e.g., in the SDAP layer). The one or more of the layers/sublayers can apply the one or more rules to perform the discarding, sending/forwarding and/or mapping.

The PDU set can have a structure including one or more particular fields. For example, the PDU set can include a self-containment indicator that indicates whether an application layer output can be generated even if the PDU set is received in incomplete form. An incomplete form can include, for example, loss of one or more PDUs in the PDU set. For example, the PDU set can include an M_pdu parameter that indicates a total number of PDUs in a PDU set. For example, the PDU set can include a C_pdu parameter that indicates a minimum number of PDUs that can be received to reconstruct the application layer output from the PDU set. For example, the PDU set can include an L_dep parameter identifying dependency on a previous PDU set. For example, the PDU set can include an R_dep parameter identifying dependency on a next PDU set. For example, the PDU set can include an SN_pdu parameter indicating a sequence number for the PDU set. These parameters may be included in an SDAP header, for example.

Figure 8:
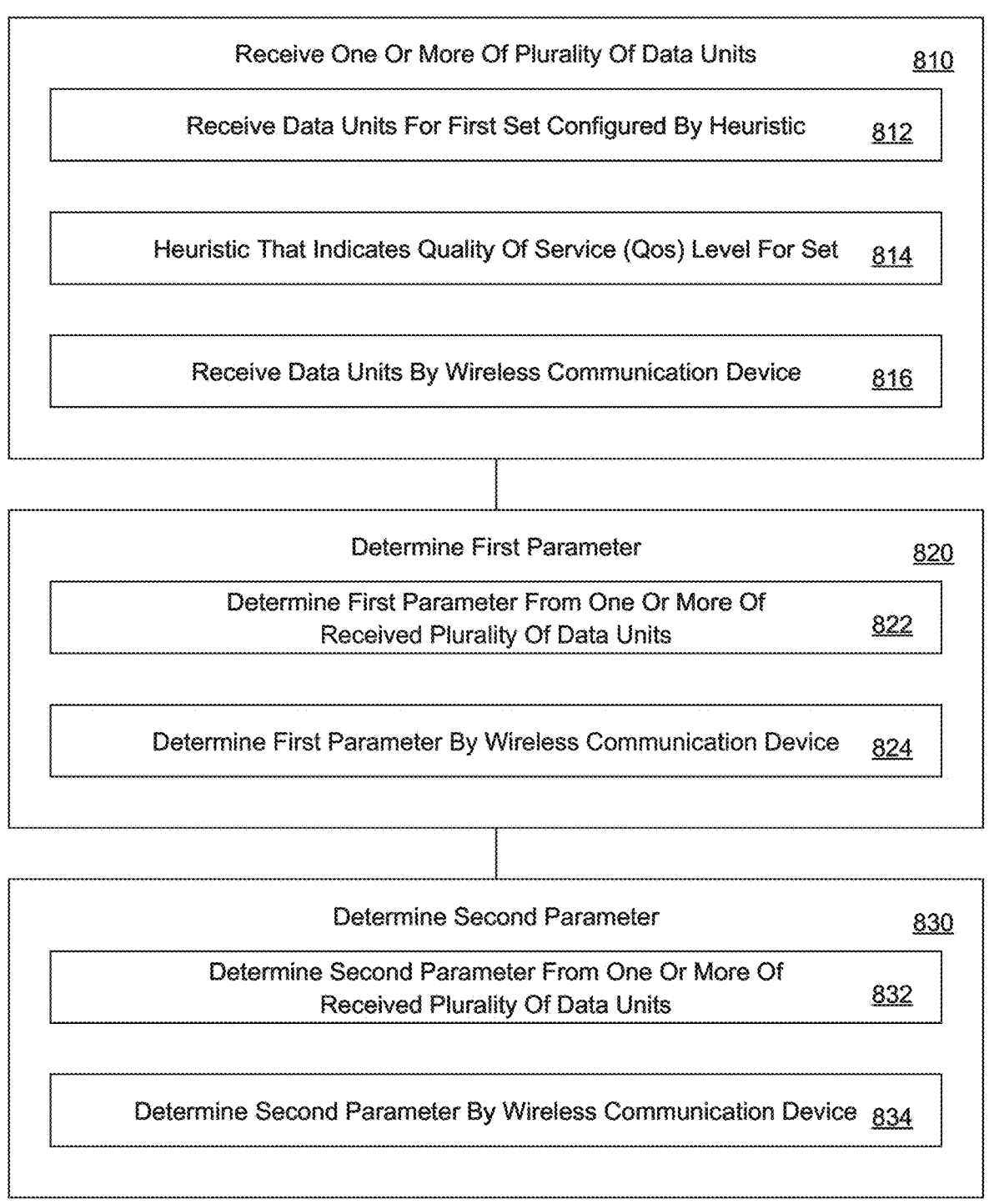
FIG. 8 depicts an example method of transmission of data unit sets by QoS level according to an example implementation of the present disclosure.

FIG. 8 depicts an example method of transmission of data unit sets by QoS level, in accordance with present implementations. At least one of the environment 100 or the system 314 (or any one or more elements/components thereof, such as a computing device or wireless communication device) can perform method 800.

At 810, the method 800 can include receiving one or more of a plurality of data units. For example, data units can correspond to PDUs. At 812, the method 800 can include receiving data units for a first set configured according to a heuristic. For example, a set can correspond to a PDU set. For example, a heuristic can correspond to one or more thresholds of a PDU. At 814, the method 800 can include/consider/determine a heuristic that indicates a QoS level for the first set. For example, a threshold can indicate a particular transmission threshold for a PDU set corresponding to gaming communication, and a different transmission threshold corresponding to a video call communication. At 816, the method 800 can including receiving data units by a wireless communication device.

At 820, the method 800 can include determining a first parameter. For example, the first parameter corresponds to a state of a respective one of the plurality of data units (e.g., indicating whether a PDU is valid or invalid). For example, a state can correspond to either a valid or invalid state of a PDU. At 822, the method 800 can include determining the first parameter from one or more of the received plurality of data units. At 824, the method 800 can determine the first parameter by the wireless communication device. At 830, the method 800 can determine a second parameter. For example, the second parameter corresponds to a dependency among a subset of the plurality of data units corresponding to the first set. At 832, the method 800 can include determining the second parameter from one or more of the received plurality of data units. At 834, the method 800 can include determining the second parameter by the wireless communication device.

Figure 9:
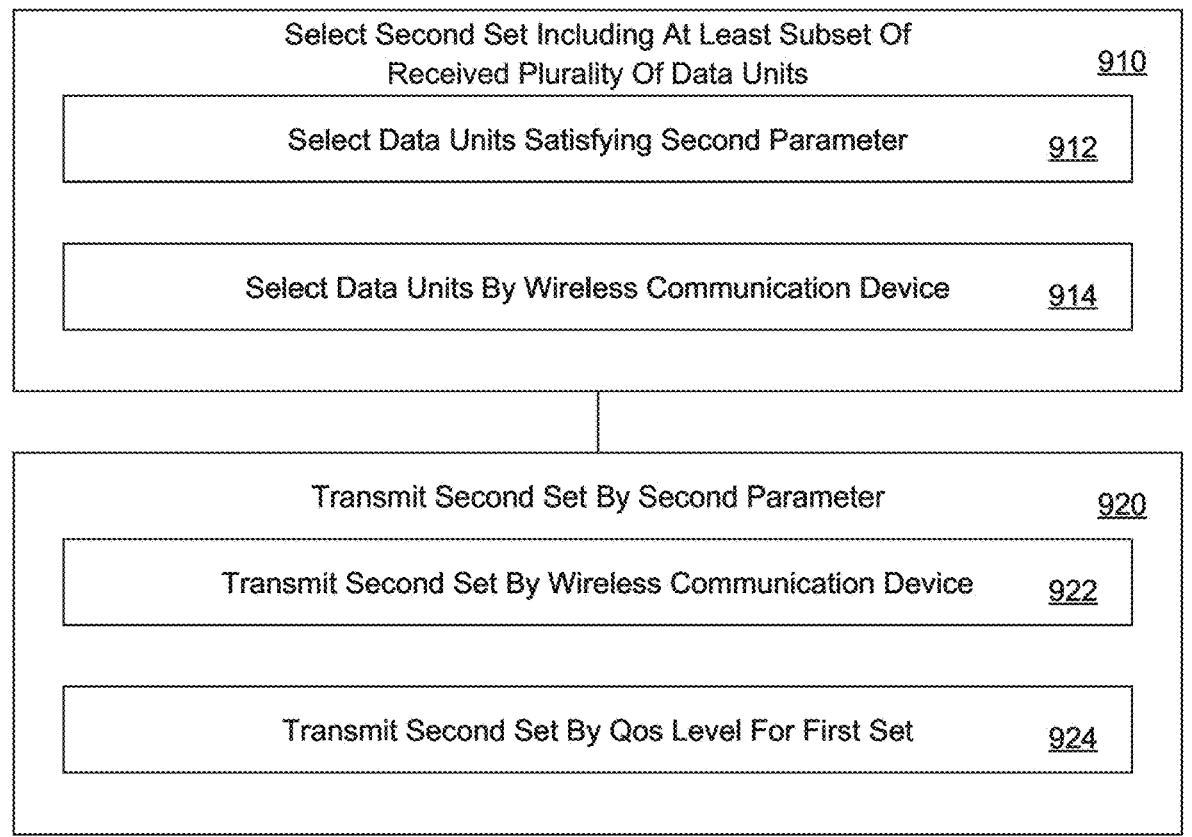
FIG. 9 depicts an example method of transmission of data unit sets by QoS level according to an example implementation of the present disclosure.

FIG. 9 depicts an example method of transmission of data unit sets by QoS level, in accordance with present implementations. At least one of the environment 100 or the system 314 can perform method 900. At 910, the method 900 can include selecting a second set including at least a subset of the received plurality of data units. At 912, the method 900 can include selecting data units satisfying the second parameter. At 914, the method 900 can include selecting the data units by the wireless communication device. At 920, the method 900 can include transmitting the second set according to the second parameter. For example, the method 900 can include transmitting the second set according to a parameter of a PDU of the second set. At 922, the method 900 can include transmitting the second set by the wireless communication device. At 924, the method 900 can include transmitting the second set according to the QoS level for the first set.

For example, the method can include selecting, by the wireless communication device according to a determination that the first parameter of one or more of the received plurality of data units satisfies the heuristic, the second set.

For example, the method can include discarding, by the wireless communication device and based at least on a dependency between the first set and a third set having a dependency with the first set, at least one of the first set or the third set according to the second parameter.

For example, the method can include determining, by the wireless communication device, a third parameter for at least one of the first set or the plurality of data units corresponding to the first set. The method can include incorporating, by the wireless communication device according to the third parameter, one or more data units into a transport block. For example, the third parameter corresponds to a transport block size (TBS) parameter that indicates a size of the transport block transmissible with a MAC layer of the wireless communication device.

For example, the method can include determining, by the wireless communication device according to at least one of a condition of a wireless channel of a network corresponding to the first set, or a degree of congestion of the network corresponding to the first set, the third parameter. For example, the method can include determining, by the wireless communication device according to a type of content of one or more of the plurality of data units corresponding to the first set, the third parameter.

For example, the wireless communication device can select, according to a determination that the first parameter of one or more of the received plurality of data units satisfies the heuristic, the second set. For example, the wireless communication device can discard, based on a dependency between the first set and the third set having a dependency with the first set, at least one of the first set or the third set, according to the second parameter. For example, the wireless communication device can determine a third parameter for at least one of the first set or the plurality of data units corresponding to the first set. The wireless communication device can incorporate, according to the third parameter, one or more data units into a transport block. For example, the wireless communication device can determine, according to at least one of a condition of a wireless channel of a network corresponding to the first set, or a degree of congestion of the network corresponding to the first set, the third parameter. For example, the wireless communication device can determine, according to a type of content of one or more of the plurality of data units corresponding to the first set, the third parameter. For example, a computer-readable medium can include a first parameter that corresponds to a state of a respective one of the plurality of data units, and the second parameter that corresponds to a dependency among a subset of the plurality of data units corresponding to the first set. For example, a condition of a wireless channel can include fading in a wireless channel. For example, fading can include time-domain fading due to Doppler effects or movement of a transceiver. For example, fading can include frequency-domain fading due to multipath effects.

Having now described some illustrative implementations, the foregoing is illustrative and not limiting, having been presented by way of example. In particular, though many of the examples presented herein involve specific combinations of method acts or system elements, those acts and those elements may be combined in other was to accomplish the same objectives. Acts, elements and features discussed in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both "A" and 'B'. Such references used in conjunction with "comprising" or other open terminology can include additional items. References to "is" or "are" may be construed as nonlimiting to the implementation or action referenced in connection with that term. The terms "is" or "are" or any tense or derivative thereof, are interchangeable and synonymous with "can be" as used herein, unless stated otherwise herein.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Directional indicators depicted herein are example directions to facilitate understanding of the examples discussed herein, and are not limited to the directional indicators depicted herein. Any directional indicator depicted herein can be modified to the reverse direction, or can be modified to include both the depicted direction and a direction reverse to the depicted direction, unless stated otherwise herein. While operations are depicted in the drawings in a particular order, such operations are not required to be performed in the particular order shown or in sequential order, and not all illustrated operations are required to be performed. Actions described herein can be performed in a different order. Where technical features in the drawings, detailed description or any claim are followed by reference signs, the reference signs have been included to increase the intelligibility of the drawings, detailed description, and claims. Accordingly, neither the reference signs nor their absence has any limiting effect on the scope of any clam elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally-formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

Scope of the systems and methods described herein is thus indicated by the appended claims, rather than the foregoing description. The scope of the claims includes equivalents to the meaning and scope of the appended claims.

What is claimed is:

1. A method, comprising:
receiving, by a wireless communication device, one or more of a plurality of data units corresponding to a first set configured according to a heuristic indicating a quality of service (QoS) level corresponding to the first set;
determining, by the wireless communication device, a first parameter from one or more of the received plurality of data units;

determining, by the wireless communication device, a second parameter from one or more of the received plurality of data units;
selecting, by the wireless communication device, a second set including at least a subset of the received plurality of data units satisfying the second parameter, wherein the second parameter indicates a dependency of the second set on the first set; and
transmitting, by the wireless communication device and according to the QoS level corresponding to the first set, the second set according to the second parameter.

2. The method of claim 1, wherein the first parameter corresponds to a state of a respective one of the plurality of data units.

3. The method of claim 1, comprising:
selecting, by the wireless communication device according to a determination that the first parameter of one or more of the received plurality of data units satisfies the heuristic, the second set.

4. The method of claim 3, comprising:
discarding, by the wireless communication device and based at least on a dependency between the first set and a third set having a dependency with the first set, at least one of the first set or the third set according to the second parameter.

5. The method of claim 1, comprising:
determining, by the wireless communication device, a third parameter for at least one of: the first set or the plurality of data units corresponding to the first set; and
incorporating, by the wireless communication device according to the third parameter, one or more data units into a transport block.

6. The method of claim 5, wherein the third parameter corresponds to a transport block size (TBS) parameter that indicates a size of the transport block transmissible with a MAC layer of the wireless communication device.

7. The method of claim 1, comprising:
determining, by the wireless communication device according to at least one of a condition of a wireless channel of a network corresponding to the first set, or a degree of congestion of the network corresponding to the first set, the third parameter.

8. The method of claim 1, comprising:
determining, by the wireless communication device according to a type of content of one or more of the plurality of data units corresponding to the first set, the third parameter.

9. A wireless communication device, comprising:
one or more processors configured to:
receive one or more of a plurality of data units corresponding to a first set configured according to a heuristic indicating a quality of service (QoS) level corresponding to the first set;
determine a first parameter from one or more of the received plurality of data units;
determine a second parameter from one or more of the received plurality of data units;
select a second set including at least a subset of the received plurality of data units satisfying the second parameter, wherein the second parameter indicates a dependency of the second set on the first set; and
transmit, according to the QoS level corresponding to the first set, the second set according to the second parameter.

10. The wireless communication device of claim 9, wherein the first parameter corresponds to a state of a respective one of the plurality of data units.

11. The wireless communication device of claim 9, wherein the one or more processors are configured to:

select, according to a determination that the first parameter of one or more of the received plurality of data units satisfies the heuristic, the second set.

12. The wireless communication device of claim 11, wherein the one or more processors are configured to:

discard, based at least on a dependency between the first set and a third set having a dependency with the first set, at least one of the first set or the third set according to the second parameter.

13. The wireless communication device of claim 9, wherein the one or more processors are configured to:

determine a third parameter for at least one of: the first set or the plurality of data units corresponding to the first set; and incorporate, according to the third parameter, one or more data units into a transport block.

14. The wireless communication device of claim 13, wherein the third parameter corresponds to a transport block size (TBS) parameter that indicates a size of the transport block transmissible with a MAC layer of the wireless communication device.

15. The wireless communication device of claim 13, wherein the one or more processors are configured to:

determine, according to at least one of a condition of a wireless channel of a network corresponding to the first set, or a degree of congestion of the network corresponding to the first set, the third parameter.

16. The wireless communication device of claim 13, wherein the one or more processors are configured to:

determine, according to a type of content of one or more of the plurality of data units corresponding to the first set, the third parameter.

17. A non-transitory computer-readable medium including one or more instructions stored thereon and executable by a processor to:

receive, by the processor, one or more of a plurality of data units corresponding to a first set configured according to a heuristic indicating a quality of service (QoS) level corresponding to the first set;

determine, by the processor, a first parameter from one or more of the received plurality of data units;

determine, by the processor, a second parameter from one or more of the received plurality of data units;

select, by the processor, a second set including at least a subset of the received plurality of data units satisfying the second parameter, wherein the second parameter indicates a dependency of the second set on the first set; and transmit, by the processor and according to the QoS level corresponding to the first set, the second set according to the second parameter.

18. The non-transitory computer-readable medium of claim 17, wherein the first parameter corresponds to a state of a respective one of the plurality of data units.

* * * * *